(12) United States Patent
Williams

(10) Patent No.: US 11,486,358 B2
(45) Date of Patent: Nov. 1, 2022

(54) RECIPROCAL MOTION WIND ENERGY HARVESTING DEVICE

(71) Applicant: Johnnie Ace Williams, Sand Springs, OK (US)

(72) Inventor: Johnnie Ace Williams, Sand Springs, OK (US)

(*) Notice: Subject to any disclaimer, the term of this patent is extended or adjusted under 35 U.S.C. 154(b) by 0 days.

(21) Appl. No.: 17/481,304

(22) Filed: Sep. 21, 2021

(65) Prior Publication Data

US 2022/0003211 A1 Jan. 6, 2022

Related U.S. Application Data

(63) Continuation-in-part of application No. 16/503,465, filed on Jul. 3, 2019, now Pat. No. 11,125,208.

(60) Provisional application No. 62/693,581, filed on Jul. 3, 2018.

(51) Int. Cl.
*F03D 9/25* (2016.01)
*F03D 15/00* (2016.01)

(52) U.S. Cl.
CPC ............... *F03D 9/25* (2016.05); *F03D 15/00* (2016.05); *F05B 2220/706* (2013.01)

(58) Field of Classification Search
CPC ............... F03D 9/25; F03D 9/28; F03D 15/10
See application file for complete search history.

(56) References Cited

U.S. PATENT DOCUMENTS

| 4,109,465 | A | 8/1978 | Plen |
| 6,717,284 | B2 | 4/2004 | Lin |
| 7,880,323 | B2 | 2/2011 | Menges |
| 8,821,120 | B1 | 9/2014 | Pandit |
| 2004/0160059 | A1 | 8/2004 | Pandian |
| 2009/0180878 | A1 | 7/2009 | Alunni |
| 2012/0171035 | A1 | 7/2012 | Fransen |

FOREIGN PATENT DOCUMENTS

FR 2808845 A1 11/2001

*Primary Examiner* — Justin D Seabe
*Assistant Examiner* — Brian O Peters

(57) ABSTRACT

A reciprocal motion wind energy harvesting device has a first vane carrier assembly and a second vane carrier assembly, which are supported by and rotate about a central shaft. The vane carrier assemblies support pluralities of vanes to receive wind force. The vanes are configured to be rotatable in order to produce opposing and reciprocating motion of the lever arm assemblies. The lever arm assemblies are operatively connected to a generator in order to convert the wind force received by the vanes into energy.

18 Claims, 10 Drawing Sheets

RECIPROCAL MOTION WIND ENERGY HARVESTING DEVICE

The current application is a continuation-in-part (CIP) application of a U.S. non-provisional application Ser. No. 16/503,465 filed on Jul. 3, 2019. The U.S. non-provisional application Ser. No. 16/503,465 claims a priority to the U.S. Provisional Patent application Ser. No. 62/693,581 filed on Jul. 3, 2018.

FIELD OF THE INVENTION

The present invention relates generally to wind-harnessing generators. More particularly, the present invention relates to wind-harnessing generators that transform mass current flow to compressive and/or electrical power.

BACKGROUND OF THE INVENTION

In the present times, individuals are always looking for ways to innovate wind powered technologies. Conventional systems known in the art, such as wind-turbines are often complex and expensive to develop/construct. Additionally, wind-turbines often operate at an optimal height that may be unsuitable for urban environments. Further, wind turbines are susceptible to damage due to the fact that they cannot be strutted along the mast.

The present invention aims to solve these problems. The present invention utilizes a self-oscillating motion/mechanism that is constructed out of cost effective, lightweight, and simple pneumatic/electrical parts. Additionally, the present invention can be deployed from the grounds-up, such that it inflates itself up to an optimal height. The present invention can also be lifted as a high-flying "self-oscillating" kite, such that the chassis of the present invention acts as lift generating air foils. Further, the present invention can be hoisted from the optimal height, due to horizontal profile of the self-oscillating motion/mechanism. In another embodiment, the present invention can be adapted to accept undercurrents associative with rivers and/or ocean currents.

Additional advantages of the invention will be set forth in part in the description which follows, and in part will be obvious from the description, or may be learned by practice of the invention. Additional advantages of the invention may be realized and attained by means of the instrumentalities and combinations particularly pointed out in the detailed description of the invention section. Further benefits and advantages of the embodiments of the invention will become apparent from consideration of the following detailed description given with reference to the accompanying drawings, which specify and show preferred embodiments of the present invention.

DETAIL DESCRIPTIONS OF THE INVENTION

Figure 1:
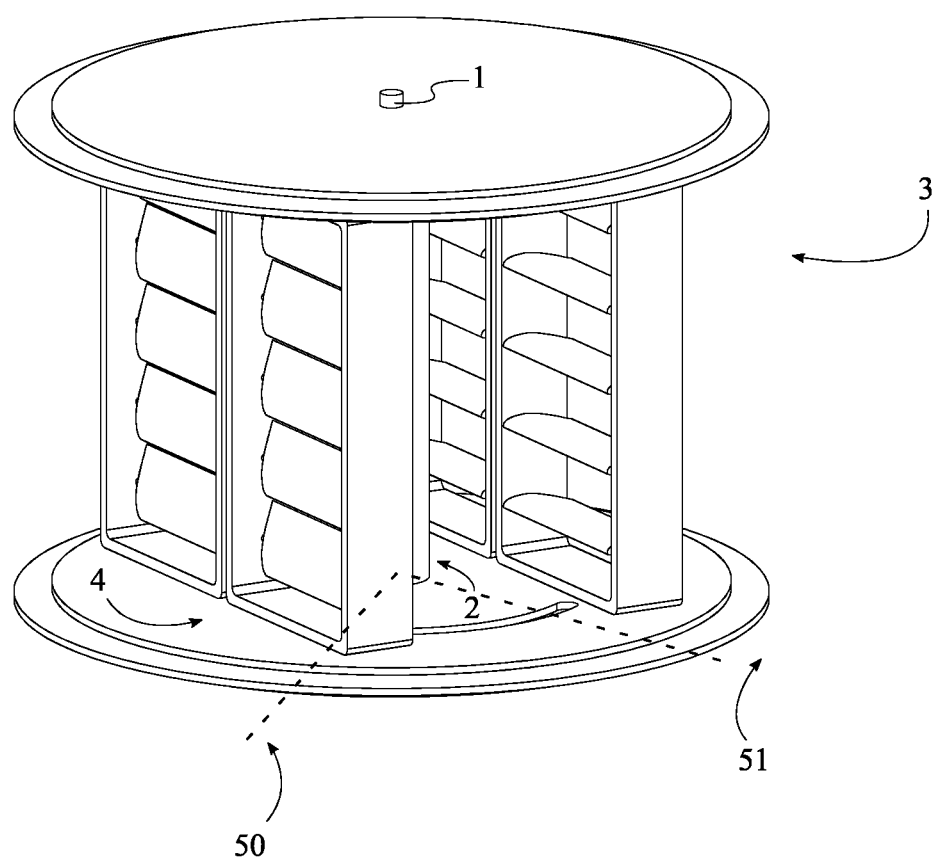
FIG. 1 is a perspective view of the present invention.

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention. References herein to "the preferred embodiment", "one embodiment", "some embodiments", or "alternative embodiments" should be considered to be illustrating aspects of the present invention that may potentially vary in some instances, and should not be considered to be limiting to the scope of the present invention as a whole.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising", when used herein, specify the presence of stated features, steps, operations, elements, various embodiments, and/or components, but do not preclude the presence or addition of one or more other features, steps, operations, elements, various embodiments, components, and/or groups thereof.

Unless otherwise defined, all terms (including technical and scientific terms) used herein have the same meaning as commonly understood by one having ordinary skill in the art to which this invention belongs. It will be further understood that terms, such as those used in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques, embodiments and/or steps are disclosed. Each of these has individual benefit and each can also be used in conjunction with one or more, or in some cases all, of the other disclosed techniques, embodiments and/or steps. Accordingly, for the sake of clarity, this description will refrain from repeating every possible combination of the individual steps, techniques or embodiments in an unnecessary fashion. Nevertheless, the specification and claims should be read with the understanding that such combinations are entirely within the scope of the invention and the claims.

New reciprocal motion wind energy harvesting devices, apparatuses, fabrications, and various qualities are discussed herein. In the following description, for purposes of explanation, numerous specific details are set forth in order to provide a thorough understanding of the present invention. It will be evident however, to one skilled in the art, that the present invention may be practiced with or without these details.

The present disclosure is to be considered as an exemplification of the invention, and it is not intended to limit the invention to the specific embodiments illustrated by the figures or descriptions.

The present invention is a device for converting wind energy into mechanical or electrical energy. Referring to FIGS. 1-5, the preferred embodiment of the present invention generally comprises a central shaft 1, at least one generator 2, a first vane carrier assembly 3, and a second vane carrier assembly 4.

The first vane carrier assembly 3 and the second vane carrier assembly 4 are each concentrically positioned with and rotatably engaged about the central shaft 1. The central shaft 1 mainly acts as a support member for the first vane carrier assembly 3 and the second vane carrier assembly 4, supporting them at a desired height in order to adequately capture wind energy. The central shaft 1 may vary in height. The central shaft 1 may be affixed into the ground or may be connected to a base for stabilization. The first vane carrier assembly 3 and the second vane carrier assembly 4 intersect with each other at the central shaft 1, and are able to rotate independently of each other about the central shaft 1.

Figure 4:
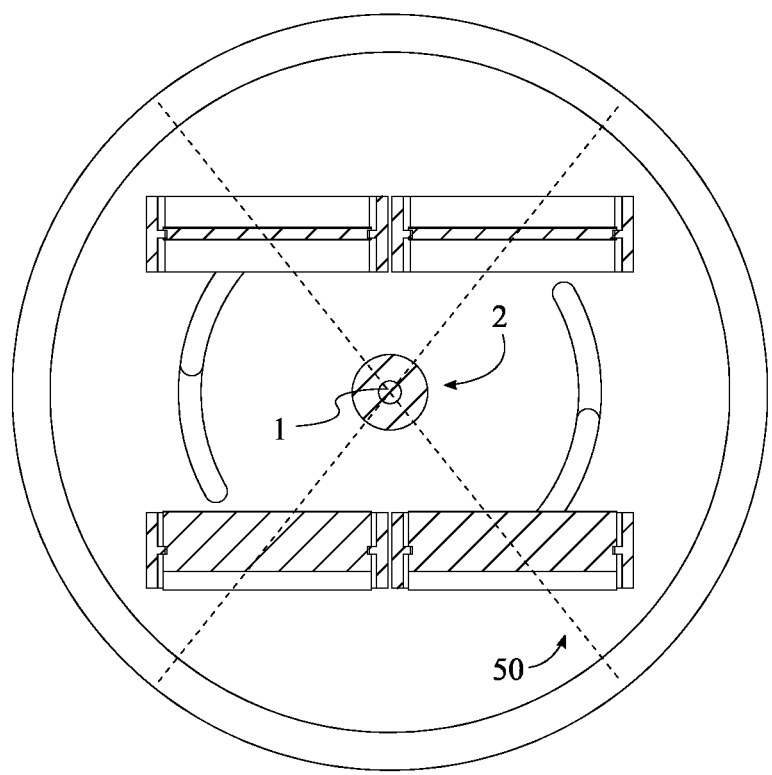
FIG. 4 is a cross-sectional view taken along A-A of FIG. 3 showing the vane carrier assemblies at a first angular position corresponding to a first stroke extremity of the reciprocating cycle of the present invention.
Figure 5:
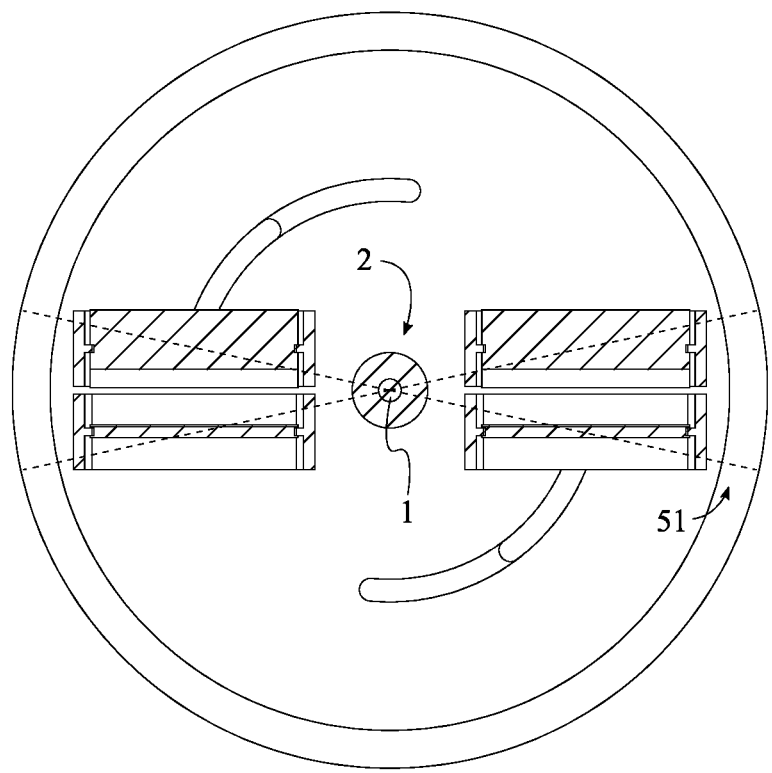
FIG. 5 is a cross-sectional view taken along A-A of FIG. 3 showing the vane carrier assemblies at a second angular position corresponding to a second stroke extremity of the reciprocating cycle of the present invention.

In the preferred embodiment, the first vane carrier assembly 3 and the second vane carrier assembly 4 are configured to counterrotate relative to each other about the central shaft 1. More particularly, in the preferred embodiment, the first vane carrier assembly 3 and the second vane carrier assembly 4 are each configured to rotationally reciprocate between a first angular position 50 and a second angular position 51 about the central shaft 1, as illustrated in FIGS. 1, 4, and 5. Thus, the first vane carrier assembly 3 and the second vane carrier assembly 4 are each constrained to a specified arc about the central shaft 1. In some embodiments, the specified arc is approximately 45 degrees. The first and second vane carrier assemblies (3, 4) rotate reciprocatingly and opposingly along the 45-degree arc due to force applied by ambient wind, and the rotation of the vane carrier assemblies (3, 4) is converted to mechanical or electrical energy through the at least one generator 2.

The first vane carrier assembly 3 and the second vane carrier assembly 4 are operatively coupled with the at least one generator 2, wherein the at least one generator 2 is configured to generate power through rotational motion of the first vane carrier assembly 3 and the second vane carrier assembly 4 about the central shaft 1. The at least one generator 2 may vary in different embodiments, and may be any type of generator suitable for utilizing the rotational motion of the first vane carrier assembly 3 and the second vane carrier assembly 4 to produce mechanical or electrical energy or work. The first vane carrier assembly 3 and the second vane carrier assembly 4 are configured to operate the at least one generator 2 through the relative reciprocating counterrotating motion of the first vane carrier assembly 3 and the second vane carrier assembly 4 about the central shaft 1. The first vane carrier and the second vane carrier function to capture ambient wind, which applies force to the vane carriers, rotating them about the central shaft 1 and thus operating the at least one generator 2 to generate power.

Figure 2:
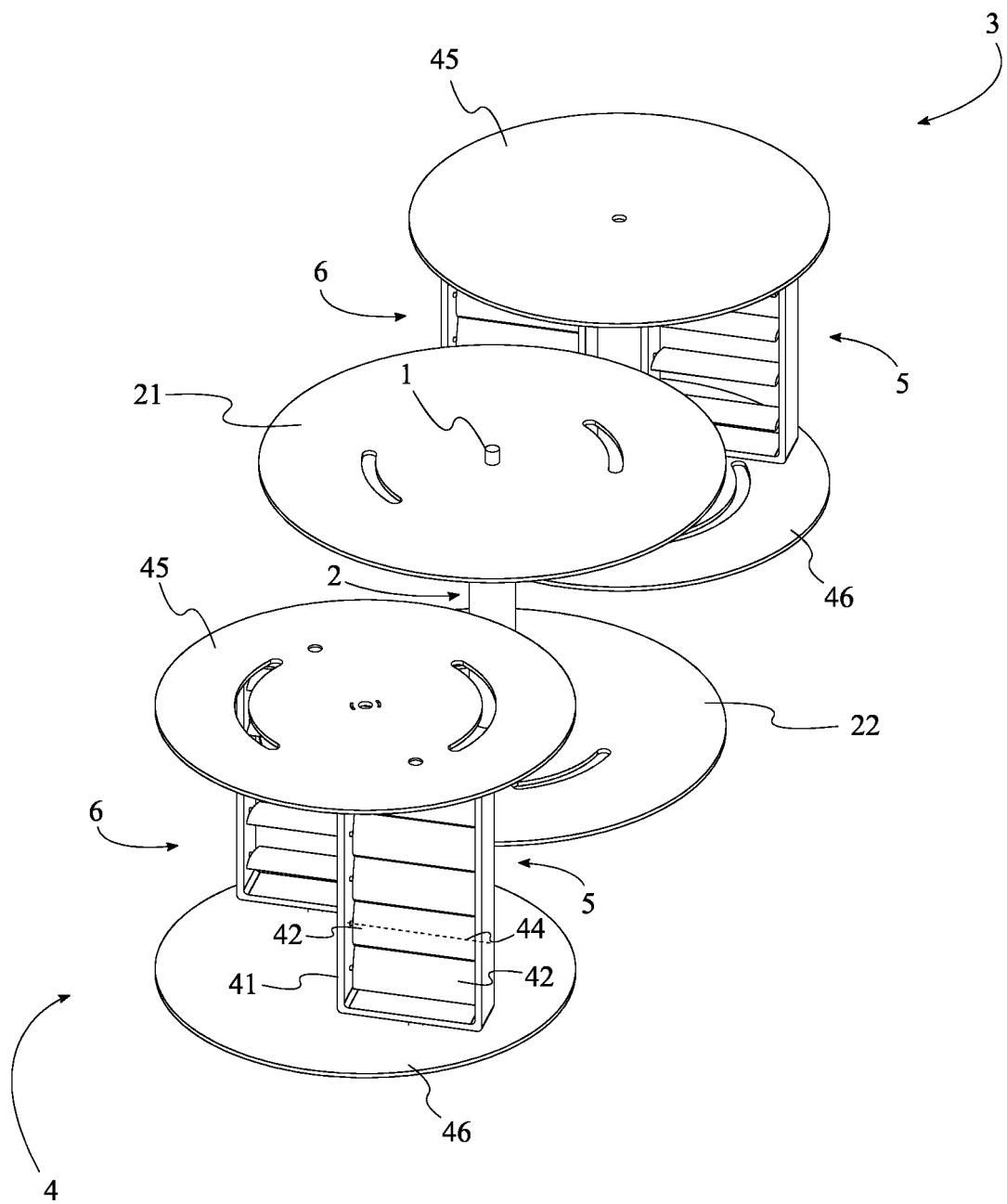
FIG. 2 is a perspective view of the present invention with the vane carrier assemblies shown in an exploded configuration.
Figure 3:
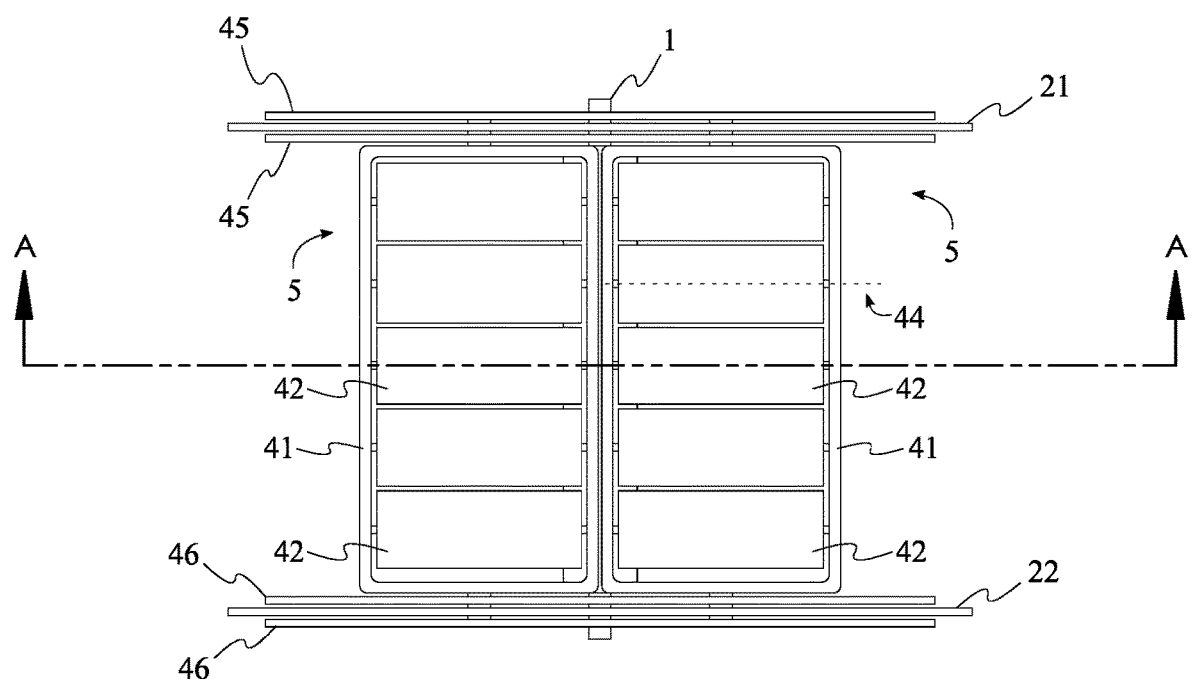
FIG. 3 is an elevation view of the present invention.
Figure 7:
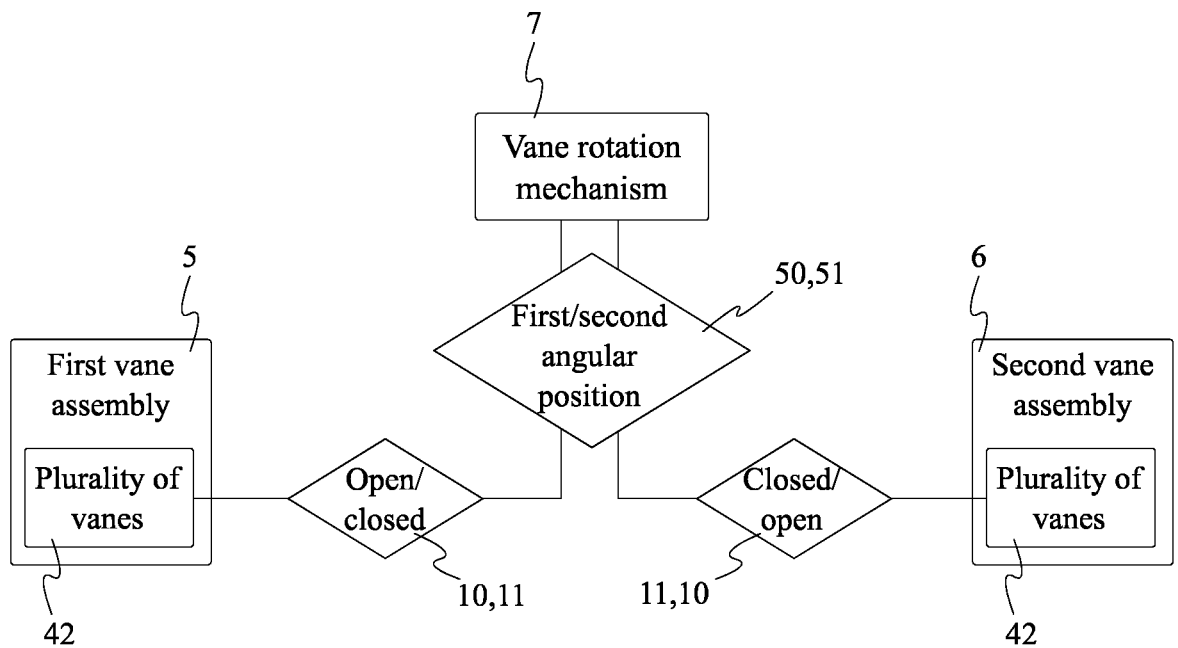
FIG. 7 is a schematic diagram illustrating the functionality of the vane rotation mechanism.

In the preferred embodiment, referring to FIGS. 2 and 7, the first vane carrier assembly 3 and the second vane carrier assembly 4 each comprise a first vane assembly 5, a second vane assembly 6, and a vane rotation mechanism 7. Thus, the preferred embodiment comprises a total of four vane assemblies (5, 6). Further, in the preferred embodiment, the first vane assembly 5 and the second vane assembly 6 each comprise a support frame 41 and a plurality of vanes 42.

In various embodiments, the specific nature of the plurality of vanes 42 may vary. In the preferred embodiment, however, each of the plurality of vanes 42 is a generally flat, curved, and/or elongated member configured to maximize surface area contact with any passing wind. Further, in the preferred embodiment, each of the plurality of vanes 42 has an airfoil cross-sectional profile in order to further maximize the efficiency of the present invention.

The first vane assembly 5 and the second vane assembly 6 are preferably, but not necessarily identical assemblies whose purpose is to support the plurality of vanes 42 in a desired position and orientation in order to capture incident wind in an efficient manner. The plurality of vanes 42 is rotatably mounted to the support frame 41, such that each of the plurality of vanes 42 is able to rotate about a pitch axis 44 in regard to the airfoil cross-sectional profile. More particularly, in the preferred embodiment, each of the plurality of vanes 42 is laterally mounted within the support frame 41, oriented generally horizontally, perpendicular to the central shaft 1, along its elongated lateral dimension. Further, the plurality of vanes 42 is serially arranged along the support frame 41. In the preferred embodiment, the plurality of vanes 42 is serially arranged vertically, being positioned one above the other, though this is not necessarily a strict requirement. For example, in some embodiment, the plurality of vanes 42 may be serially arranged horizontally, or in another orientation or configuration. The nature of the support frame 41 may vary and may constitute any form capable of properly supporting the plurality of vanes 42 during operation of the present invention.

In the preferred embodiment, the first vane assembly 5 and the second vane assembly 6 are positioned opposite each other about the central shaft 1; more particularly, the first vane assembly 5 and the second vane assembly 6 are positioned symmetric with each other about the central shaft 1 for each of the first vane carrier assembly 3 and the second vane carrier assembly 4. Moreover, the first vane assembly 5 of the first vane carrier assembly 3 and the first vane assembly 5 of the second vane carrier assembly 4 are preferably positioned symmetric about the central shaft 1. Thus, two imaginary lines drawn between the centroids of the first and second vane assemblies (5, 6) of the first and second vane carrier assemblies (3, 4) will cross and form a doubly symmetric X shape, as seen in FIGS. 4-5. This is an important geometrical relation, as will be discussed further on in the present disclosure. Further, in the preferred embodiment, the first vane assembly 5 and the second vane assembly 6 of each of the first vane carrier assembly 3 and the second vane carrier assembly 4 are oriented parallel to each other. All four vane assemblies (5, 6) should generally not rotate relative to themselves, and their motion should be restricted to translation along the specified arc about the central shaft 1 defined by the connection of the vane assemblies (5, 6) to the vane carrier assemblies (3, 4). This is desirable because in order to capture the maximum possible wind energy from ambient wind incident on the vane assemblies (5, 6), the vane assemblies (5, 6) should be oriented as close to perpendicular to the direction of the ambient wind as possible.

Figure 6:
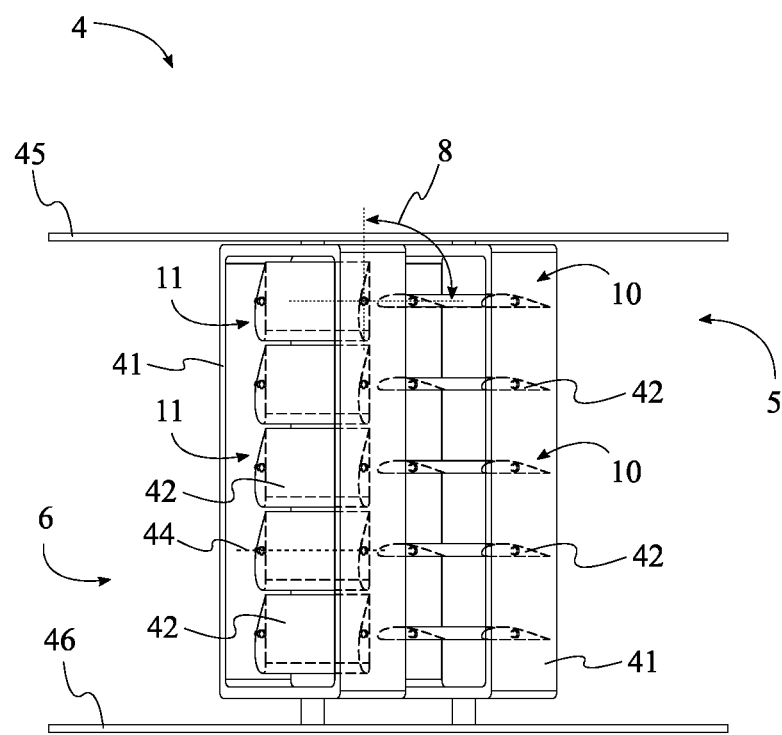
FIG. 6 is an angled plan view of the present invention illustrating the plurality of vanes of the first vane assembly and the second vane assembly being oriented at an opposing angle to each other.

The plurality of vanes 42 of the first vane assembly 5 and the plurality of vanes 42 of the second vane assembly 6 are selectably oriented at an opposing angle 8 to each other, as illustrated in FIG. 6. As illustrated in FIG. 7, the vane rotation mechanism 7 is operatively connected to each of the plurality of vanes 42 of the first vane assembly 5 and the second vane assembly 6, wherein the vane rotation mechanism 7 is configured to rotate each of the plurality of vanes 42 of each of the first vane assembly 5 and the second vane assembly 6. More particularly, the vane rotation mechanism 7 is configured to rotate each of the plurality of vanes 42 of each of the first vane assembly 5 and the second vane assembly 6 between an open position 10 and a closed position 11 at each of the first angular position 50 and the second angular position 51, as illustrated in FIGS. 4-7. That is to say, when either the first angular position 50 or the second angular position 51 is reached, the vane rotation mechanism 7 is triggered to rotate the vanes either from the open position 10 to the closed position 11 or from the closed position 11 to the open position 10.

It is contemplated that in various embodiments, the at least one generator 2 may vary. In various embodiments, the at least one generator 2 may be configured to convert the rotational motion of the first vane carrier assembly 3 and the second vane carrier assembly 4 into mechanical energy, electrical energy, or any applicable type of energy. Further, the at least one generator 2 may vary in specific implementation and means to facilitate said conversion. However, in the preferred embodiment, the at least one generator 2 comprises a first stator 21 and a second stator 22. The first stator 21 and the second stator 22 may vary in different embodiments, but in the preferred embodiment, the first stator 21 and the second stator 22 are generally disc shaped. The first stator 21 and the second stator 22 are positioned vertically opposite each other along the central shaft 1, wherein the first vane assembly 5 and the second vane assembly 6 of each of the first vane carrier assembly 3 and the second vane carrier assembly 4 are positioned between the first stator 21 and the second stator 22.

Further, in the preferred embodiment, the first vane carrier assembly 3 and the second vane carrier assembly 4 each further comprise an upper rotor 45 and a lower rotor 46. The upper rotor 45 and the lower rotor 46 are concentrically positioned within and rotatably engaged about the central shaft 1 for each of the first vane carrier assembly 3 and the second vane carrier assembly 4. The upper rotor 45 and the lower rotor 46 are positioned opposite each other along the central shaft 1 for each of the first vane carrier assembly 3 and the second vane carrier assembly 4. The first vane assembly 5 and the second vane assembly 6 are rotatably connected between the upper rotor 45 and the lower rotor 46 for each of the first vane carrier assembly 3 and the second vane carrier assembly 4. Preferably, the vane assemblies (5, 6) are oriented perpendicular to the upper rotor 45 and the lower rotor 46, though this is not necessarily a requirement in all embodiments. The first stator 21 and the second stator 22 are configured to generate electrical power through rotational motion of the first rotor and the second rotor of each of the first vane carrier assembly 3 and the second vane carrier assembly 4 relative to the first stator 21 and the second stator 22. This may be accomplished through any suitable means, such as, but not limited to, conductive wiring being arranged across the interior, exterior, or any other suitable location on the stators and rotors in order to generate electricity.

With the first vane carrier assembly 3 and the second vane carrier assembly 4 both being concentrically positioned around the central shaft 1, there must be some geometric offset between them. This may be simply accomplished by one of the vane carrier assemblies (3, 4) being positioned at a slightly different axial height along the central shaft 1 than the other. Thus, starting from the top of the present invention and proceeding to the bottom, the components encountered are, in order, in an exemplary embodiment: the upper rotor 45 of the first vane carrier assembly 3; the first stator 21; the upper rotor 45 of the second vane carrier assembly 4; the four vane assemblies (5, 6); the lower rotor 46 of the first vane carrier assembly 3; the second stator 22; and finally, the lower rotor 46 of the second vane carrier assembly 4.

In addition to the previously disclosed stator and rotor arrangement for generating electricity, in the preferred embodiment the at least one generator 2 may further comprise a second means of power generation. Thus, referring to FIG. 8, in various embodiments the at least one generator 2 may comprise a bellows assembly 23 and at least one flexible chamber 34. The bellows assembly 23 is positioned around and encircles the central shaft 1, while the at least one flexible chamber 34 is positioned within the bellows assembly 23. The first vane carrier assembly 3 and the second vane carrier assembly 4 are operatively connected to the bellows assembly 23, wherein the first vane carrier assembly 3 and the second vane carrier assembly 4 are configured to operate the bellows assembly 23 in order to generate power by cyclically compressing the at least one flexible chamber 34, wherein the bellows assembly 23 is configured to compress the at least one flexible chamber 34 as a result of the counterrotating movement of the first vane carrier assembly 3 and the second vane carrier assembly 4.

As the first vane carrier assembly 3 and the second vane carrier assembly 4 rotate about the central shaft 1, the rotational motion of the first vane carrier assembly 3 and the second vane carrier assembly 4 is transferred to the bellows assembly 23, which is suitably configured in its geometry to convert said rotational motion into compressive force in order to compress the at least one flexible chamber 34.

This compression of the at least one flexible chamber 34 by the bellows, which is in turn operated by the first vane carrier assembly 3 and the second vane carrier assembly 4, is one of the two mechanisms disclosed herein, in addition to the aforementioned stator and rotor electricity generation arrangement, through which the present invention ultimately converts wind energy captured by the vanes into usable mechanical or electrical energy. The at least one flexible chamber 34 may be configured in any applicable means to expel air or other fluid, which may be captured through various means and converted into useful mechanical or electrical energy.

Further, in various embodiments, the bellows assembly 23 may further comprise at least one intake valve 30 and at least one exhaust valve 32. The at least one intake valve 30 and the at least one exhaust valve 32 are each one-way valves, so that the at least one intake valve 30 is configured to receive air or other fluid into the at least one flexible chamber 34 during an intake stroke of the vane carrier assemblies (3, 4), while the exhaust valve is configured to expel air from the at least one flexible chamber 34 during an exhaust stroke of the vane carrier assemblies (3, 4). As discussed, the exhaust valve may be operatively connected to any suitable means for converting the fluid expelled from the flexible chamber through the exhaust valve into mechanical or electrical energy, such as, but not limited to, a pneumatic at least one generator 2, or a pump, or flywheel, or any other applicable means of energy conversion.

In various embodiments, the bellows assembly 23 may vary, and may comprise any components and arrangement thereof suitable for converting the rotational motion of the lever arm assemblies into compressive force in order to compress the at least one flexible chamber 34. In some embodiments, the bellows assembly 23 may comprise a plurality of plates hingedly connected together around the central shaft 1, geometrically configured in order to compress the at least one flexible chamber 34 based on the reciprocating counterrotating movement of the vane carrier assemblies (3, 4).

In the preferred embodiment, the bellows assembly 23 has a generally circular cross section and is composed of multiple sections radially distributed about the circular cross section, each section being delineated from the others as a compressible unit. More particularly, in the preferred embodiment, the at least one flexible chamber 34 comprises a plurality of flexible chambers 35, the at least one generator 2 further comprises a plurality of air intake plenums 25, and the bellows assembly 23 further comprises a plurality of intake valves 31 and a plurality of exhaust valves 33 as the at least one intake valve 30 and the at least one exhaust valve 32, respectively.

The plurality of flexible chambers 35 and the plurality of air intake plenums 25 are mounted within the bellows assembly 23, wherein the plurality of intake valves 31 is configured to direct air into the plurality of air intake plenums 25, and wherein the plurality of exhaust valves 33 is configured to expel air from the plurality of air intake plenums 25 as a result of being compressed out of one of the plurality of flexible chambers 35. Preferably, the plurality of flexible chambers 35 and the plurality of air intake plenums 25 are radially and alternatingly distributed around the central shaft 1. In this embodiment, each of the plurality of flexible chambers 35 comprises multiple alternating folds, creating an accordion-like form. These accordion-like flexible chambers may be compressed laterally and radially about the central shaft 1, along a generally circular direction concentric with the central shaft 1.

The X shape of the vane assemblies (5, 6) previously mentioned now becomes particularly relevant. As the first vane carrier assembly 3 and the second vane carrier assembly 4 progress through their reciprocal counterrotation, the extremities of the arms of the X, corresponding with the centroids of the vane assemblies (5, 6), trace a doubly symmetric path along a circular profile concentric with the central shaft 1. Due to the counterrotation, any given limb of the X at any given time is moving toward one of its angular neighbors and away from the other.

Figure 8:
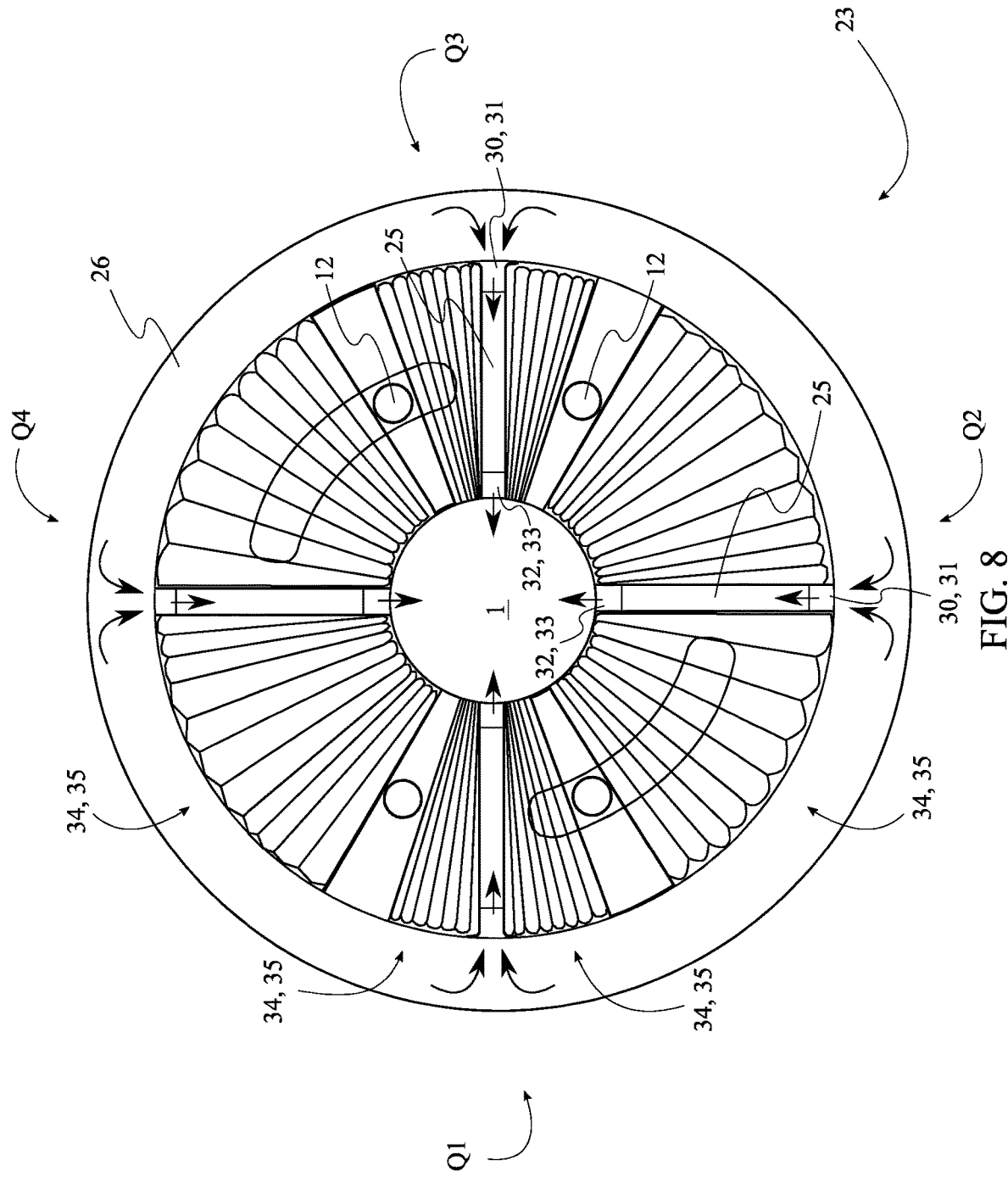
FIG. 8 is an exemplary cross-sectional plan illustration of an embodiment of the bellows assembly.
Figure 9:
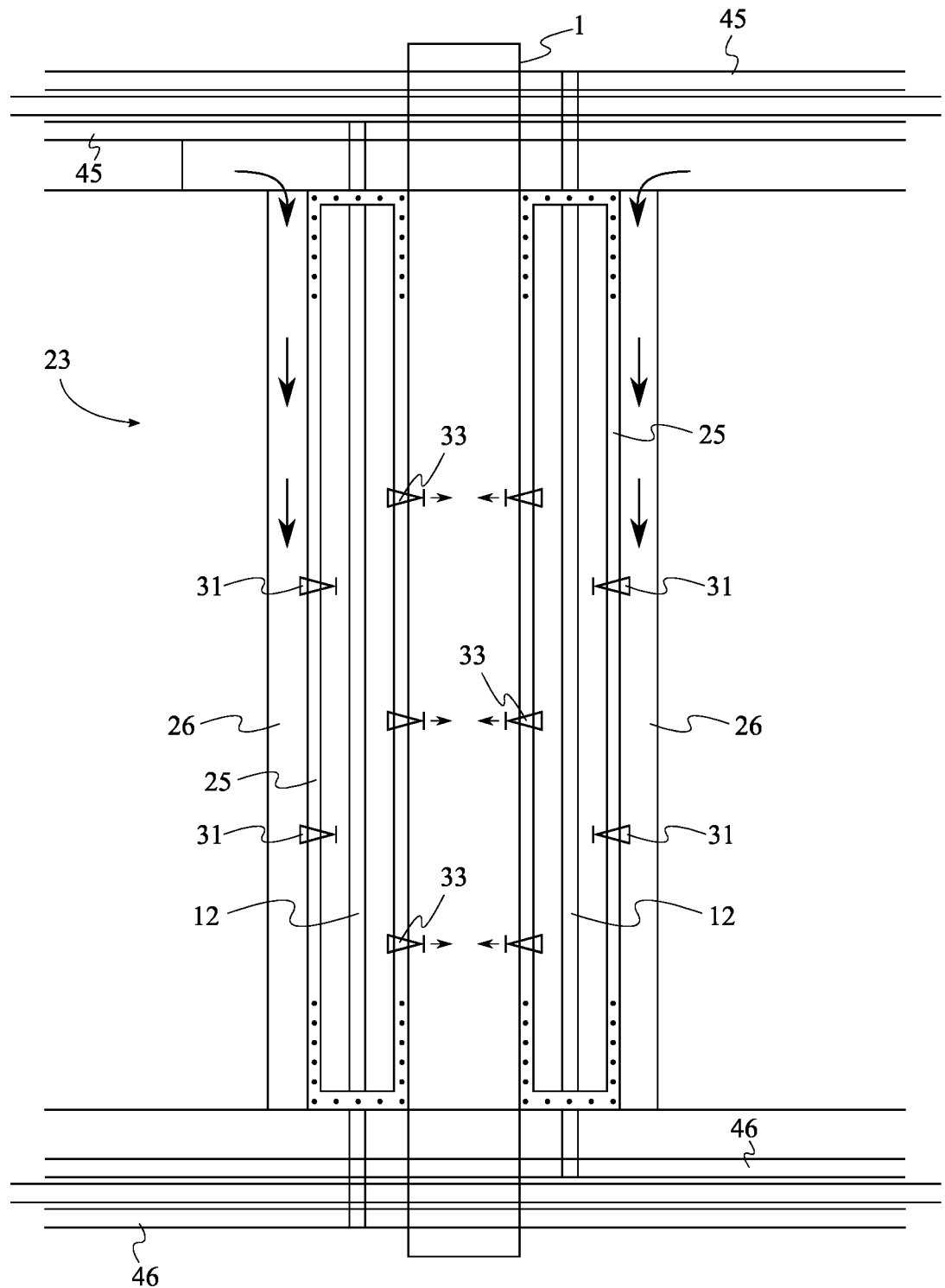
FIG. 9 is an exemplary cross-sectional elevation illustration of an embodiment of the bellows assembly.

Further, each of the first vane carrier assembly 3 and the second vane carrier assembly 4 comprises a plurality of bellows drive pins 12, as seen in FIGS. 8-9. Each plurality of bellows drive pins 12 is connected between a corresponding upper rotor 45 and lower rotor 46 as previously described for the first vane carrier assembly 3 and the second vane carrier assembly 4. The plurality of bellows drive pins 12 traverses through the bellows assembly 23, wherein the bellows assembly 23 is operated by the counterrotation of the first vane varies assembly and the second vane carrier assembly 4 in order to generate power, and wherein the plurality of bellows drive pins 12 function to physically manipulate the plurality of flexible chambers 35 in accordance with the reciprocating counterrotation motion and the previously described X motion. To accomplish this, each of the plurality of bellows drive pins 12 is affixed in any suitably enabling fashion to a suitable location of one or more of the flexible chambers.

In some embodiments, as shown in FIGS. 8-9, each the plurality of bellows drive pins 12 traverses through one of the plurality of air intake plenums 25 of the bellows assembly 23, wherein the plurality of flexible chambers 35 of the bellows assembly 23 is cyclically compressed by the plurality of air intake plenums 25 as a result of the counterrotation of the first vane carrier assembly 3 and the second vane carrier.

The preferred embodiment comprises four flexible chambers arranged into four quadrants within the bellows assembly 23, corresponding with the X shape, as seen in FIG. 8. For the purposes of the present description, the four quadrants may be referred to as quadrants Q1 through Q4, progressing radially around the bellows assembly 23. Thus, at any given moment, quadrants Q1 and Q3 experience the opposite of quadrants Q2 and Q4. While quadrants Q1 and Q3 undergo compression, quadrants Q2 and Q4 experience a correspondingly opposite expansion from a compressed state, and vice versa. Thus, at any given moment, one of the pairs of quadrants is undergoing a power stroke. The air expelled from the compressed flexible chambers may be utilized to generate power in any suitable way, such as a pneumatic generator as previously mentioned.

Each of the air intake plenums 25 constitutes a structural component serving the purpose of providing a location to attach the flexible chambers 34, intake valves 31, and any other relevant components within the bellows assembly 23. Each air intake plenum 25 may be understood to traverse the entirety or majority of the vertical length of the bellows assembly 23 as appropriate in various embodiments. The air intake plenums 25 essentially perform the role of gatekeepers of entrance into the interior of the bellows assembly 23 and into the flexible chambers 34. In some embodiments, the air intake plenums 25 are constructed of steel material, though the material of the air intake plenums 25 may vary in different embodiments as appropriate.

Further, in the preferred embodiment, the bellows assembly 23 further comprises an outer pressure chamber 26. The outer pressure chamber 26 is connected concentrically around the plurality of flexible chambers 35 and the plurality of air intake plenums 25, and the plurality of intake valves 31 is in fluid communication between the outer pressure chamber 26 and the plurality of flexible chambers 35.

Figure 10:
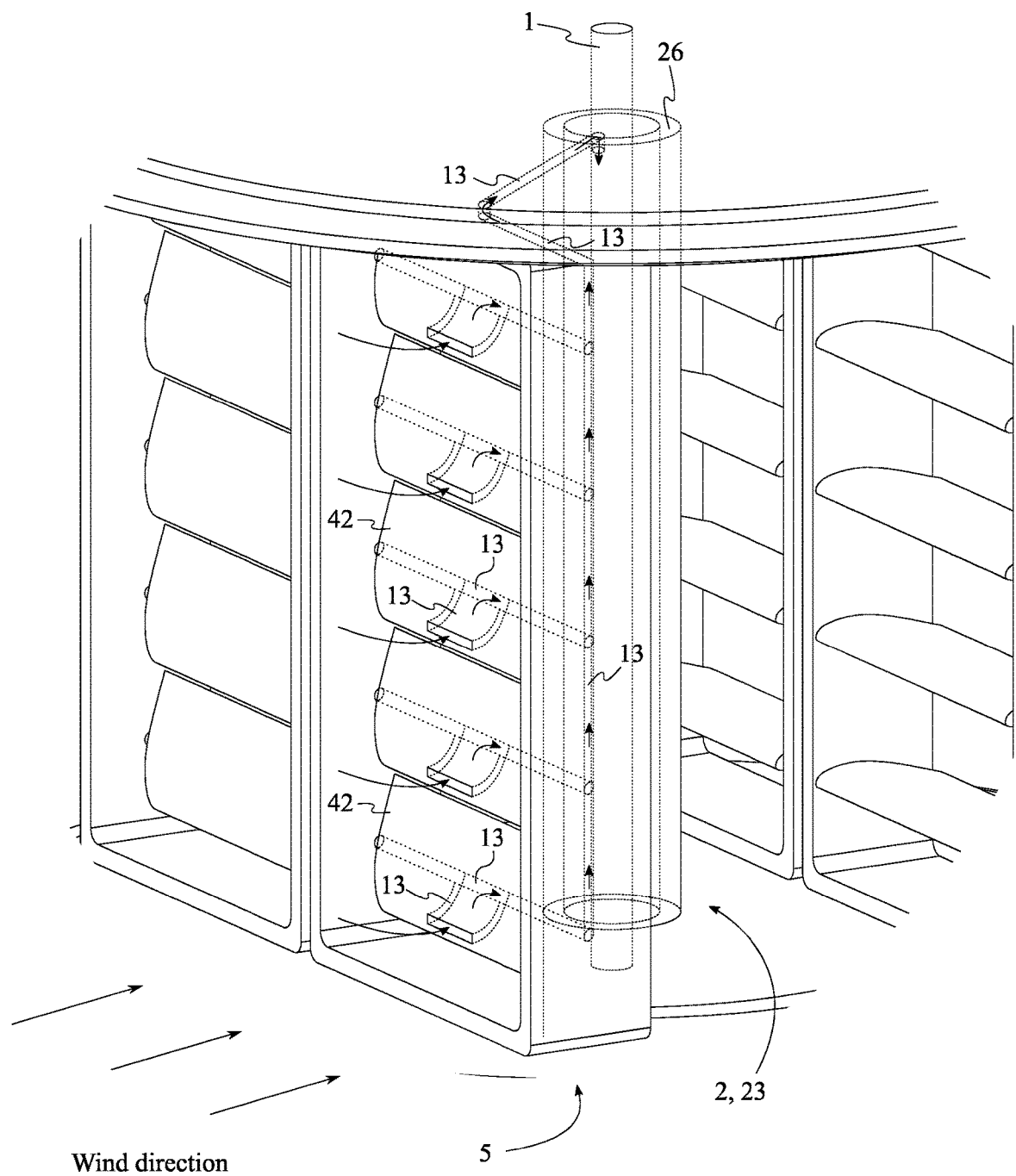
FIG. 10 is an exemplary perspective detail view with hidden lines illustrating a plurality of air ducts functioning to capture air flow at the plurality of vanes and direct the airflow into an outer pressure chamber in an embodiment of the present invention.

In order to maximize the power-generating efficiency of the present invention, the ambient wind may further be collected and ducted into the bellows assembly 23 to increase the pressure therein and therefore the power output. To this end, in some embodiments, as shown in FIG. 10, the first vane carrier assembly 3 and the second vane carrier assembly 4 each comprise a plurality of air ducts 13. The plurality of air ducts 13 traverses into the plurality of vanes 42 of the first vane assembly 5 and the second vane assembly 6 of each of the first vane carrier assembly 3 and the second carrier assembly, through the first vane carrier assembly 3 and the second vane carrier assembly 4, and into the bellows assembly 23 of the at least one generator 2, wherein the plurality of air ducts 13 is in fluid communication between the plurality of vanes 42 of the first vane assembly 5 and the second vane assembly 6 and the bellows assembly 23. Further, in some embodiments, the plurality of air ducts 13 traverses through the first vane carrier assembly 3 and the second vane carrier assembly 4 into an outer pressure chamber 26 of the bellows assembly 23, wherein the plurality of air ducts 13 is in fluid communication with the plurality of intake valves 31 through the outer pressure chamber 26. Alternatively stated, wind is connected into the vanes and ducted internally along the vane assemblies (5, 6) and vane carrier assemblies (3, 4), finally arriving at the interior of the flexible chambers.

The following is a collection of descriptions of various potential and/or alternative features of the present invention.

There must be air intakes for the boxed bellows. These will be located on either end of the vertical boxes and made to draw air through a conduit system created within the Lever's long arm structures.

All air outlets should be described as flexible connections made on either end of boxed bellows, where the flexible lining material will meet the two, flat horizontal surfaces, top and bottom. of the oscillating arms.

All air inlets should be described as located at the outer ends of the lever structures to take advantage of the greater air pressure created by the lever's oscillations.

This feature is designed to increase the volume of ambient air within the bellows during the "vacuum stroke", thus increasing the overall volume pressurized during the "compression stroke".

One way valves are located inside the conduit system and made accessible through the levers.

The bellow's role is to act as a speed controller for the rotors. Electrical current is created by rotating the disks and transmitted down the main tube. The bellows energy will be utilized or exhausted. Once the main bellows tube is pressurized the rotor speed is maintained by the bellow's pressure & flow rate.

It only made sense to make the stator disks wide enough to fix posts onto & around them in order to box their forms. Perimeter posts may be placed every 60 degrees. This made stacking the machines simple but look like a corral.

Meshed wire may be stretched around the entirety of the present invention in order to eliminate bird kills.

The bellow's discharge rate may be used to control the rotor speed.

The vanes wind force is used to overcome the rotational resistance created by the electromagnetic forces. The present invention essentially utilizes basic generator architecture made flat.

Ring and pinion gears are preferably utilized for timing purposes in the present invention. The bellow's air energy may be utilized in a hydrogen making process.

Coupling this stroke to a 4 chambered bellows system is similar to coupling a piston to a crankshaft. It creates a new mechanical stroke.

Further, the bellows vacuum chamber can be made to operate in a closed loop with the pressure chamber.

A useful feature for sealed habitats or environments like Mars where the wind is adequate, but the atmosphere is not.

Finally, a plurality of vertical tubes may be placed around the perimeter of the stators. They strengthen the machine structure and function to keep wildlife out.

Although the invention has been explained in relation to its preferred embodiment, it is to be understood that many other possible modifications and variations can be made without departing from the spirit and scope of the invention as hereinafter claimed.

What is claimed is:

1. A reciprocal motion wind energy harvesting device comprising:
   a central shaft;
   a first vane carrier assembly;
   a second vane carrier assembly;
   at least one generator;
   the first vane carrier assembly and the second vane carrier assembly being concentrically positioned with and rotatably engaged about the central shaft;
   the first vane carrier assembly and the second vane carrier assembly being configured to counterrotate relative to each other about the central shaft;
   the first vane carrier assembly and the second vane carrier assembly being operatively coupled with the at least one generator, wherein the at least one generator is configured to generate power through rotational motion of the first vane carrier assembly and the second vane carrier assembly about the central shaft;
   the first vane carrier assembly and the second vane carrier assembly each comprising a first vane assembly, a second vane assembly, and a vane rotation mechanism;
   the first vane assembly and the second vane assembly being positioned opposite each other about the central shaft;
   the first vane assembly and the second vane assembly each comprising a support frame and a plurality of vanes;
   the plurality of vanes being rotatably mounted to the support frame;
   the plurality of vanes of the first vane assembly and the plurality of vanes of the second vane assembly being selectably oriented at an opposing angle to each other; and
   the vane rotation mechanism being operatively connected to each of the plurality of vanes of the first vane assembly and the second vane assembly, wherein the vane rotation mechanism is configured to rotate each of the plurality of vanes of each of the first vane assembly and the second vane assembly.

2. The reciprocal motion wind energy harvesting device as claimed in claim 1, wherein the first vane carrier assembly and the second vane carrier assembly are each configured to rotationally reciprocate between a first angular position and a second angular position about the central shaft.

3. The reciprocal motion wind energy harvesting device as claimed in claim 2, wherein the vane rotation mechanism is configured to rotate each of the plurality of vanes of each of the first vane assembly and the second vane assembly between an open position and a closed position at each of the first angular position and the second angular position.

4. The reciprocal motion wind energy harvesting device as claimed in claim 1, wherein the first vane carrier assembly and the second vane carrier assembly are configured to operate the at least one generator through relative rotational motion of the first vane carrier assembly and the second vane carrier assembly about the central shaft.

5. The reciprocal motion wind energy harvesting device as claimed in claim 1, wherein the first vane assembly and the second vane assembly of each of the first vane carrier assembly and the second vane carrier assembly are oriented parallel to each other.

6. The reciprocal motion wind energy harvesting device as claimed in claim 1 comprising:
   the plurality of vanes being laterally mounted within the support frame; and
   the plurality of vanes being serially arranged along the support frame.

7. The reciprocal motion wind energy harvesting device as claimed in claim 1 comprising:
   the at least one generator comprising a first stator and a second stator;

the first stator and the second stator being positioned vertically opposite each other along the central shaft, wherein the first vane assembly and the second vane assembly of each of the first vane carrier assembly and the second vane carrier assembly are positioned between the first stator and the second stator;

the first vane carrier assembly and the second vane carrier assembly each further comprising an upper rotor and a lower rotor;

the upper rotor and the lower rotor being concentrically positioned with and rotatably engaged about the central shaft for each of the first vane carrier assembly and the second vane carrier assembly;

the upper rotor and the lower rotor being positioned opposite each other along the central shaft for each of the first vane carrier assembly and the second vane carrier assembly;

the first vane assembly and the second vane assembly being rotatably connected between the upper rotor and the lower rotor for each of the first vane carrier assembly and the second vane carrier assembly; and the first stator and the second stator being configured to generate electrical power through rotational motion of the first rotor and the second rotor of each of the first vane carrier assembly and the second vane carrier assembly relative to the first stator and the second stator.

8. The reciprocal motion wind energy harvesting device as claimed in claim 1 comprising:

the at least one generator comprising a bellows assembly and at least one flexible chamber;

the bellows assembly being positioned around the central shaft;

the at least one flexible chamber being positioned within the bellows assembly; and the first vane carrier assembly and the second vane carrier assembly being operatively connected to the bellows assembly, wherein the first vane carrier assembly and the second vane carrier assembly are configured to operate the bellows assembly in order to generate power by cyclically compressing the at least one flexible chamber.

9. The reciprocal motion wind energy harvesting device as claimed in claim 8 comprising:

the bellows assembly further comprising at least one intake valve and at least one exhaust valve; and the intake valve and the exhaust valve each being a one-way valve, wherein the intake valve is configured to receive air into the at least one flexible chamber, and wherein the exhaust valve is configured to expel air from the at least one flexible chamber.

10. The reciprocal motion wind energy harvesting device as claimed in claim 9 comprising:

the exhaust valve being in fluid communication with a pneumatic generator.

11. The reciprocal motion wind energy harvesting device as claimed in claim 8 comprising:

the at least one flexible chamber comprising a plurality of flexible chambers;

the at least one generator further comprising a plurality of air intake plenums;

the bellows assembly further comprising a plurality of intake valves and a plurality of exhaust valves;

the plurality of flexible chambers and the plurality of air intake plenums being mounted within the bellows assembly, wherein the plurality of intake valves is configured to direct air into the plurality of air intake plenums, and wherein the plurality of exhaust valves is configured to expel air from the plurality of air intake plenums.

12. The reciprocal motion wind energy harvesting device as claimed in claim 11, wherein the plurality of flexible chambers and the plurality of air intake plenums are radially and alternatingly distributed around the central shaft.

13. The reciprocal motion wind energy harvesting device as claimed in claim 11 comprising:

the bellows assembly further comprising an outer pressure chamber; and the outer pressure chamber being connected concentrically around the plurality of flexible chambers and the plurality of air intake plenums; and the plurality of intake valves being in fluid communication between the outer pressure chamber and the plurality of flexible chambers.

14. The reciprocal motion wind energy harvesting device as claimed in claim 1 comprising:

each of the first vane carrier assembly and the second vane carrier assembly comprising a plurality of bellows drive pins;

the plurality of bellows drive pins being connected between an upper rotor and a lower rotor for each of the first vane carrier assembly and the second vane carrier assembly;

the plurality of bellows drive pins traversing through a bellows assembly of the at least one generator, wherein the bellows assembly is operated by the counterrotation of the first vane carrier assembly and the second vane carrier in order to generate power.

15. The reciprocal motion wind energy harvesting device as claimed in claim 14 comprising:

each the plurality of bellows drive pins traversing through one of a plurality of air intake plenums of the bellows assembly, wherein a plurality of flexible chambers of the bellows assembly is cyclically compressed by the plurality of air intake plenums as a result of the counterrotation of the first vane carrier assembly and the second vane carrier.

16. The reciprocal motion wind energy harvesting device as claimed in claim 14 comprising:

each the plurality of bellows drive pins traversing through one of a plurality of air intake plenums of the bellows assembly, wherein a plurality of flexible chambers of the bellows assembly is cyclically compressed by the plurality of air intake plenums as a result of the counterrotation of the first vane carrier assembly and the second vane carrier.

17. The reciprocal motion wind energy harvesting device as claimed in claim 1 comprising:

the first vane carrier assembly and the second vane carrier assembly each comprising a plurality of air ducts; and the plurality of air ducts traversing into the plurality of vanes of the first vane assembly and the second vane assembly of each of the first vane carrier assembly and the second carrier assembly, through the first vane carrier assembly and the second vane carrier assembly, and into a bellows assembly of the at least one generator, wherein the plurality of air ducts is in fluid communication between the plurality of vanes of the first vane assembly and the second vane assembly and the bellows assembly.

18. The reciprocal motion wind energy harvesting device as claimed in claim 16 comprising:

the plurality of air ducts traversing through the first vane carrier assembly and the second vane carrier assembly into an outer pressure chamber of the bellows assembly, wherein the plurality of air ducts is in fluid communication with the plurality of intake valves through the outer pressure chamber.

\* \* \* \* \*